US012684378B2

(12) United States Patent
Usuba et al.

(10) Patent No.: US 12,684,378 B2
(45) Date of Patent: *Jul. 14, 2026

(54) LOCAL 5G MONITORING SYSTEM USING WIRELESS TERMINAL

(71) Applicant: ANRITSU CORPORATION, Kanagawa (JP)

(72) Inventors: Mitsuhiro Usuba, Kanagawa (JP); Atsushi Furuki, Kanagawa (JP); Yoshihiro Fukagawa, Kanagawa (JP); Satoshi Sasaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 487 days.

This patent is subject to a terminal disclaimer.

(21) Appl. No.: 18/067,339

(22) Filed: Dec. 16, 2022

(65) Prior Publication Data

US 2023/0292158 A1 Sep. 14, 2023

(30) Foreign Application Priority Data

Mar. 9, 2022 (JP) ................................. 2022-036359

(51) Int. Cl.
*H04W 24/08* (2009.01)
*H04W 24/10* (2009.01)
(52) U.S. Cl.
CPC ........... *H04W 24/08* (2013.01); *H04W 24/10* (2013.01)

(58) Field of Classification Search
CPC .............................. H04W 24/08; H04W 24/10
See application file for complete search history.

(56) References Cited

U.S. PATENT DOCUMENTS

2021/0136603 A1* 5/2021 Kottkamp ............. H04W 24/00
2022/0294715 A1* 9/2022 Agrawal ................. H04L 43/04

FOREIGN PATENT DOCUMENTS

| CN | 114125912 A | * | 3/2022 | ............. H04W 24/02 |
| JP | 2020-005009 A | | 1/2020 | |

* cited by examiner

*Primary Examiner* — Noel R Beharry
(74) *Attorney, Agent, or Firm* — McDonald Hopkins LLC

(57) ABSTRACT

The local 5G monitoring system includes the wireless terminals that measure radio waves from a base station of a local 5G system, a first server device that belongs to the same wireless local area network (wireless LAN) as the wireless terminals, collects measurement data from the wireless terminals, and is connected to the Internet, and a second server device that is connected to the first server device via the Internet, and is configured to be referred to by a user, in which the first server device uses the measurement data from the wireless terminals when installation of the local 5G system is completed, as reference information, and determines and notifies the user that an abnormal state occurs, when the measurement data from the wireless terminals during an operation of the local 5G system exceeds a threshold from the reference information.

10 Claims, 2 Drawing Sheets

Reference information database

Measurement result

Reference information

| | Terminal 2a | Terminal 2b | Terminal 2c | Terminal 2d | Terminal 2e |
|---|---|---|---|---|---|
| Position | A | B | C | D | E |
| Radio waves | W a | W b | W c | W d | W e |
| Throughput | T a | T b | T c | T d | T e |
| Delay | D a | D b | D c | D d | D e |

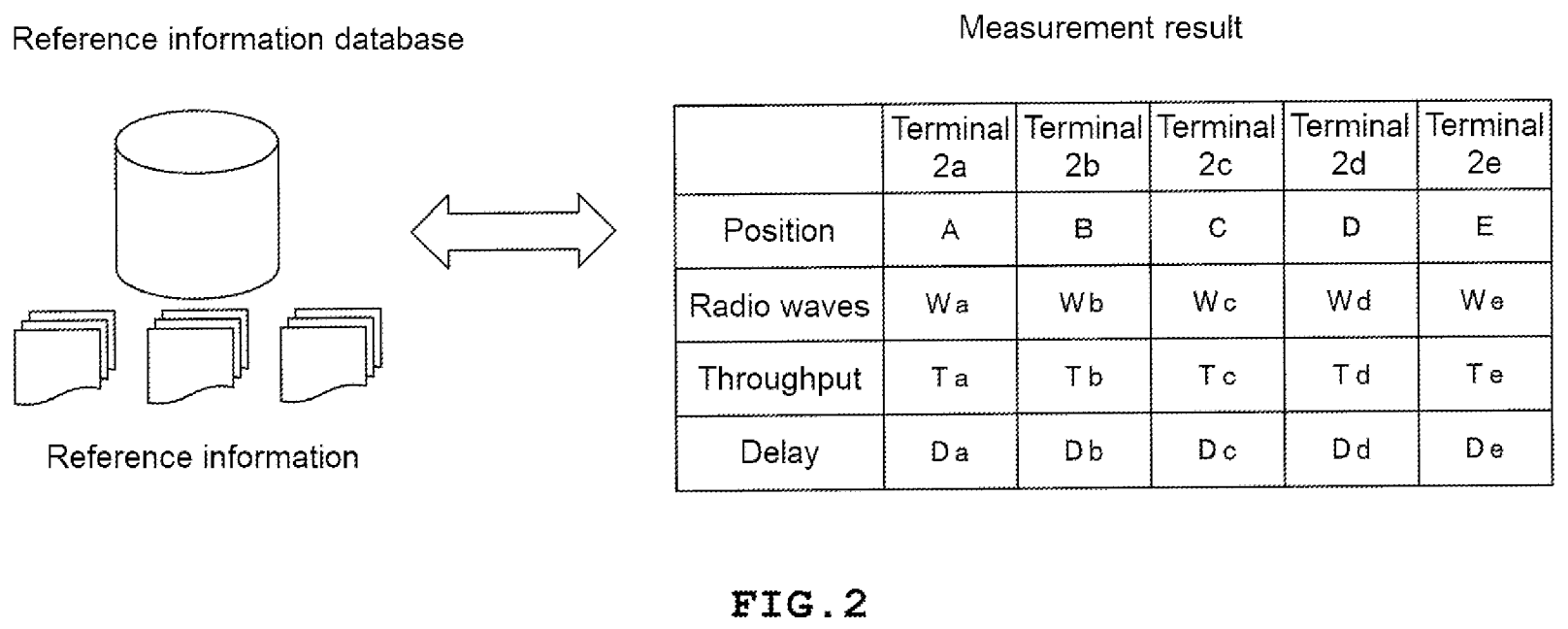

Measurement result

|  | Terminal 2a | Terminal 2b | Terminal 2c | Terminal 2d | Terminal 2e |
|---|---|---|---|---|---|
| Position | A | B | C | D | E |
| Radio waves | Wa | Wb | Wc | Wd | We |
| Throughput | Ta | Tb | Tc | Td | Te |
| Delay | Da | Db | Dc | Dd | De |

Reference information database

Reference information

FIG. 2

LOCAL 5G MONITORING SYSTEM USING WIRELESS TERMINAL

TECHNICAL FIELD

The present invention relates to a local 5G monitoring system for monitoring the operational performance of a local 5G system.

BACKGROUND ART

Local 5G systems have been provided in which by using the various techniques used in the fifth generation mobile communication system (hereinafter also referred to as "5G"), organizations (local governments, companies, or the like) that are not telecommunications carriers have facilities and uses the facilities for exclusively providing services on land it owns or as self-employed communication facilities. Note that the local 5G system is sometimes called a private 5G system.

After such a local 5G system is installed in the user's actual field, in subsequent operations, abnormal states such as a decrease in a transmission speed or communication delay may occur due to factors such as equipment failure or stoppage and radio interference.

Unlike a network configuration using a relatively inexpensive wireless local area network (LAN), the local 5G system is an expensive system that emphasizes large capacity and low delay, and a time when abnormal states such as a decrease in a transmission speed or communication delay occur needs to be kept extremely short.

Patent Document 1 describes constant monitoring of the radio environment within the communication area of a wireless network.

RELATED ART DOCUMENT

Patent Document

[Patent Document 1] JP-A-2020-5009

DISCLOSURE OF THE INVENTION

Problem that the Invention is to Solve

However, some measuring devices that measure local 5G systems are expensive, for example, more than 1 million yen, and there is a cost barrier to installing and monitoring a large number of measuring devices.

Further, in some cases, the measuring device may not have wireless communication means as an interface for transferring measured data, and it has not been possible to flexibly install or add measuring devices.

Therefore, an object of the present invention is to provide a local 5G monitoring system using wireless terminals capable of inexpensively performing measurement at multiple points and flexibly changing and adding measurement points.

Means for Solving the Problem

A local 5G monitoring system using a wireless terminal according to the present invention is a local 5G monitoring system that monitors a local 5G system, including: the wireless terminal that is connected to a network of the local 5G monitoring system by wireless communication and measures radio waves from a base station of the local 5G system;

a first server device that belongs to the same wireless local area network (wireless LAN) as the wireless terminal, collects measurement data from the wireless terminal, and is connected to the Internet; and a second server device that is connected to the first server device via the Internet, and is configured to be referred to by a user, in which the first server device uses the measurement data from the wireless terminal when installation of the local 5G system is completed, as reference information, and determines and notifies the user that an abnormal state occurs, when the measurement data from the wireless terminal during an operation of the local 5G system exceeds a threshold from the reference information.

With this configuration, measurement is performed by a wireless terminal connected to the network of the local 5G monitoring system by wireless communication. Therefore, it is possible to perform measurements at multiple points at a low cost, and to flexibly change or add the measurement points.

Further, in the local 5G monitoring system using a wireless terminal according to the present invention, the wireless terminal measures a state of Internet Protocol (IP) data communication in a wireless network of the local 5G system in addition to the radio waves, as the measurement data.

With this configuration, it is possible to detect an abnormal state of the IP data communication of the wireless network of the local 5G system, based on the measurement data when the local 5G system is installed.

Further, in the local 5G monitoring system using a wireless terminal according to the present invention, there are a plurality of the wireless terminals, and the second server device displays the measurement data for each of the wireless terminals.

With this configuration, it is possible to enable checking of the measurement data of each wireless terminal via the Internet, and it is possible to quickly respond to an abnormal state.

Further, in the local 5G monitoring system using a wireless terminal according to the present invention, the second server device makes display of the measurement data, from which it is determined as the abnormal state, different from other displays.

With this configuration, the measurement data, from which it is determined as an abnormal state, is displayed differently from other displays, so that it is possible to quickly identify the measurement data in the abnormal state, and quickly respond to the abnormal state.

Advantage of the Invention

The present invention can provide a local 5G monitoring system using a wireless terminal capable of inexpensively performing measurement at multiple points and flexibly changing and adding measurement points.

BRIEF DESCRIPTION OF THE DRAWINGS

FIG. 2 is a conceptual diagram of an abnormal state detection method for the local 5G monitoring system according to the embodiment of the present invention.

BEST MODE FOR CARRYING OUT THE INVENTION

Figure 1:
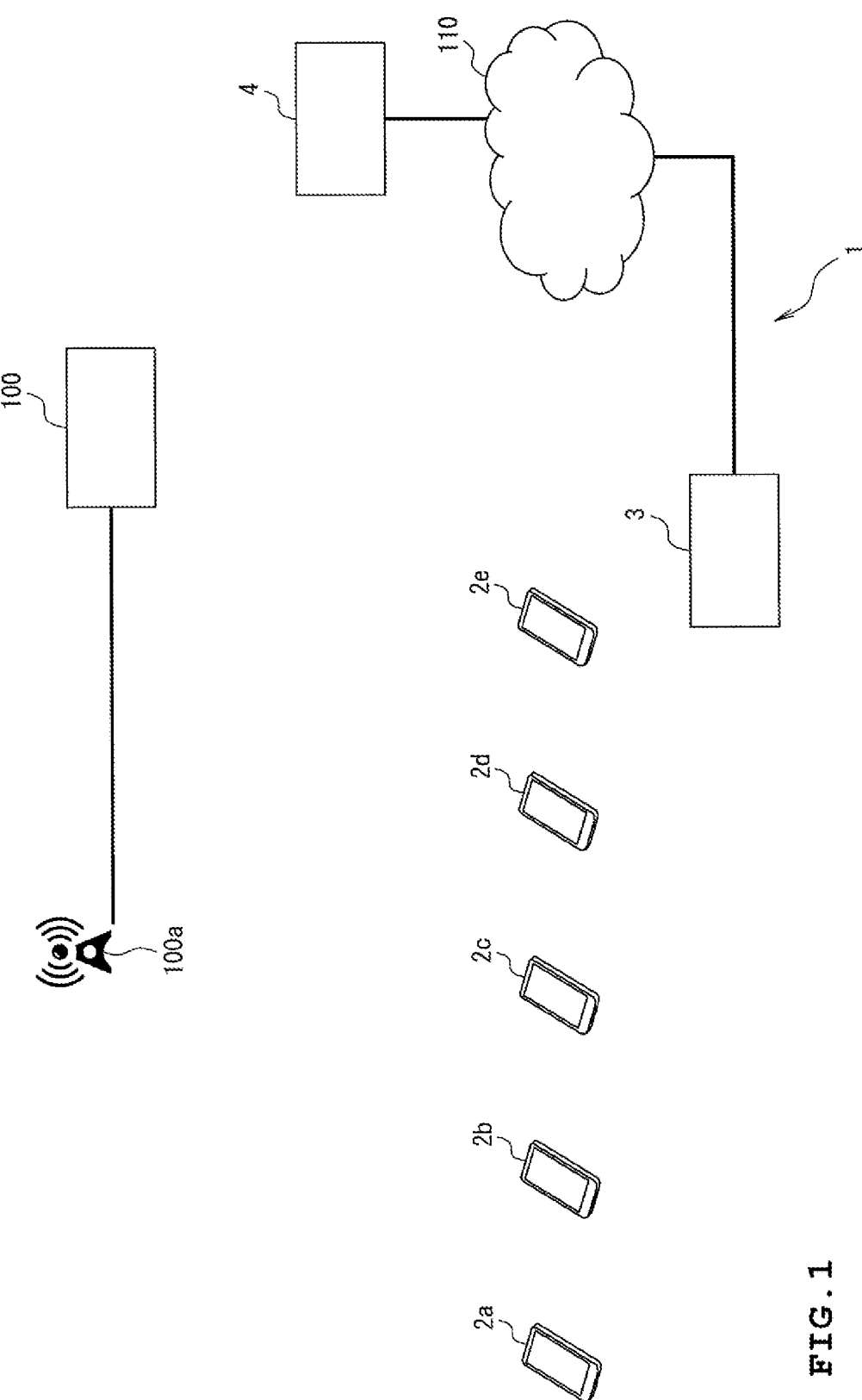
FIG. 1 is a schematic configuration diagram of a local 5G monitoring system according to an embodiment of the present invention.

Hereinafter, a local 5G monitoring system according to an embodiment of the present invention will be described in detail with reference to the drawings.

In FIG. 1, a local 5G monitoring system 1 according to an embodiment of the present invention is installed within the service area of a local 5G system 100.

The local 5G monitoring system 1 monitors the state of radio waves from the base station 100a of the local 5G system 100, the state of IP data communication in the wireless network of the local 5G system 100, and the like, and determines whether an abnormal state occurs.

The local 5G monitoring system 1 includes a plurality of wireless terminals 2a, 2b, 2c, 2d, and 2e, a first server device 3, and a second server device 4.

The wireless terminals 2a, 2b, 2c, 2d, and 2e are smartphones, mobile terminals, or the like that support 5G communication. Note that, in the present embodiment, the wireless terminals 2a, 2b, 2c, 2d, and 2e are mainly used by being fixed to predetermined installation positions.

The wireless terminals 2a, 2b, 2c, 2d, and 2e measure radio waves from the base station 100a of the local 5G system 100. The wireless terminals 2a, 2b, 2c, 2d, and 2e measure IP data communication of the local 5G system 100. The wireless terminals 2a, 2b, 2c, 2d, and 2e measure throughput, communication delay, or the like, as IP data communication measurements.

The wireless terminals 2a, 2b, 2c, 2d, and 2e are capable of wireless communication such as wireless LAN and Long Term Evolution (LTE), and can access the wireless LAN of the local 5G monitoring system 1 and the Internet 110 by wireless communication.

The first server device 3 and the second server device 4 are each a computer device. The computer devices each include a central processing unit (CPU), a read only memory (ROM), a random access memory (RAM), a non-volatile storage medium such as a hard disk device, various input/output ports, a display device, and an input device such as a pointing device or a keyboard device, which are not shown.

Programs for controlling the respective computer devices are stored in the ROMs and hard disk devices of these computer devices. That is, the computer device performs the control of the present embodiment, by the CPU executing the programs stored in the ROM and the hard disk device using the RAM as a work area.

The first server device 3 is connected to a wireless LAN and can communicate via the wireless LAN. The first server device 3 and the wireless terminals 2a, 2b, 2c, 2d, and 2e are connected by the wireless LAN of the local 5G monitoring system 1, and can transmit and receive data to and from each other via the wireless LAN.

The first server device 3 is connected to the Internet 110, and can transmit and receive e-mails and access social networking service (SNS) via the Internet.

The second server device 4 is connected to the Internet 110, and the first server device 3 and the second server device 4 can transmit and receive data to and from each other via the Internet 110.

The second server device 4 has, for example, a function of a web server, and can provide information to personal computers and smartphones via the Internet 110.

In the present embodiment, the first server device 3 uses the measurement data measured by the wireless terminals 2a, 2b, 2c, 2d, and 2e when the local 5G system 100 is installed, as reference information, and makes a notification in a case where the measurement data measured by the wireless terminals 2a, 2b, 2c, 2d, and 2e during the operation of the local 5G system 100 exceeds a threshold from the reference information and deteriorate.

In the local 5G system 100, the required throughput, communication delay, or the like is designed, the base station 100a, or the like is installed while performing measurement by the measuring device and the wireless terminals 2a, 2b, 2c, 2d, and 2e so as to satisfy the designed throughput and communication delay, and when it is checked that the designed throughput and communication delay are satisfied, the installation is completed.

For example, when registration of reference information is selected by an input to the input device, the first server device 3 stores the measurement data obtained by the wireless terminals 2a, 2b, 2c, 2d, and 2e at the time of the selection, as the reference information, in the hard disk device.

For example, as shown in FIG. 2, the first server device 3 stores the measurement data measured by the wireless terminals 2a, 2b, 2c, 2d, and 2e when the local 5G system 100 is installed, as reference information, in the reference information database. The reference information database is stored in the hard disk device of the first server device 3, for example.

As the measurement data by the wireless terminals 2a, 2b, 2c, 2d, and 2e, for example, as shown in FIG. 2, the state of radio waves (shown as "radio waves" in FIG. 2), throughput, delay, and the like are measured.

As the state of radio waves, for example, Reference Signal Received Power (RSRP), Reference Signal Received Quality (RSRQ), or the like are measured.

Since the measurement of RSRP and RSRQ is performed by the basic software of the wireless terminals 2a, 2b, 2c, 2d, and 2e, the information is acquired by, for example, a smartphone application, or the like and is transmitted to the first server device 3 as measurement data.

Throughput and delay are measured by communicating with, for example, a server device and a measuring device provided in the local 5G system 100.

The wireless terminals 2a, 2b, 2c, 2d, and 2e, for example, perform wireless communication with a server device provided in the local 5G system 100 via the base station 100a to measure throughput and delay.

For example, the wireless terminals 2a, 2b, 2c, 2d, and 2e transmit an "echo request" packet of Internet Control Message Protocol (ICMP) to the server device, and measure the wireless network delay of the local 5G system 100 by using time until an "echo reply" is returned from the server device (Round-Trip Time).

The wireless terminals 2a, 2b, 2c, 2d, and 2e perform wireless communication with the server device provided in the local 5G system 100, for example, by a smartphone application or the like, via the base station 100a to measure throughput and delay.

For example, the first server device 3 compares the measurement data from the wireless terminals 2a, 2b, 2c, 2d, and 2e with the reference information at predetermined time intervals, and determines that an abnormal state occurs, when the measurement data exceeds a threshold from the reference information and deteriorates.

For example, the first server device 3 determines that an abnormal state occurs, when at least one of the RSRP values measured by the wireless terminals 2a, 2b, 2c, 2d, and 2e exceeds a threshold from the reference information and is reduced.

For example, the first server device 3 determines that an abnormal state occurs, when at least one of the throughputs measured by the wireless terminals 2a, 2b, 2c, 2d, and 2e exceeds a threshold from the reference information and is reduced.

For example, the first server device 3 determines that an abnormal state occurs, when at least one of the network delays measured by the wireless terminals 2a, 2b, 2c, 2d, and 2e exceeds a threshold from the reference information and increases.

In addition, it is determined that it is abnormal in a case where the measurement data of at least one of the wireless terminals 2a, 2b, 2c, 2d, and 2e exceeds a threshold from the reference information and deteriorates, but it may be determined that it is abnormal in a case where the measurement data of a predetermined number of wireless terminals 2a, 2b, 2c, 2d, and 2e exceeds a threshold from the reference information and deteriorates.

Further, the threshold may be changed depending on the installation positions of the wireless terminals 2a, 2b, 2c, 2d, and 2e.

When detecting that an abnormal state has occurred, the first server device 3 notifies a user of the detection.

The first server device 3 notifies the user by, for example, warning display on a display device or the like, alarm sound by a buzzer or the like, transmission of an e-mail, posting on an SNS, or the like.

The first server device 3 transmits measurement data of the wireless terminals 2a, 2b, 2c, 2d, and 2e to the second server device 4.

When detecting that an abnormal state has occurred, the first server device 3 transmits the information to the second server device 4 together with the measurement data of the wireless terminals 2a, 2b, 2c, 2d, and 2e. The first server device 3 transmits, to the second server device 4, for example, the information on the wireless terminals 2a, 2b, 2c, 2d, and 2e determined to be in an abnormal state, the difference between the measurement data and the threshold, and the like, as abnormal state information.

The second server device 4 accumulates and manages the measurement data received from the first server device 3 in time series such that it can be referred to from, for example, a browser of a personal computer or a smartphone.

The second server device 4 displays measurement data on each of the wireless terminals 2a, 2b, 2c, 2d, and 2e, for example, as in the table shown in FIG. 2.

The second server device 4 displays, for example, the measurement data, the wireless terminals 2a, 2b, 2c, 2d, and 2e, of which measurement data is determined to be in an abnormal state, in a changed color so as to be displayed differently from other measurement data, measuring devices, for example.

The second server device 4, for example, analyzes the measurement data of each of the wireless terminals 2a, 2b, 2c, 2d, and 2e in time series, and displays the wireless terminals 2a, 2b, 2c, 2d, and 2e, which have detected a sign of an abnormal state, differently from other measuring devices, by displaying them in different colors, or the like.

The second server device 4 uses, for example, artificial intelligence (AI) to detect the sign of an abnormal state.

The second server device 4 may accumulate and manage measurement data from a plurality of first server devices 3 and provide information via the Internet 110.

By doing so, it is possible to centrally manage a plurality of local 5G systems 100 installed in remote locations, and to efficiently monitor the systems.

As described above, in the above-described embodiment, measurements are performed by the wireless terminals 2a, 2b, 2c, 2d, and 2e that support 5G communication, so measurements can be performed at multiple points at a low cost.

Further, since the wireless terminals 2a, 2b, 2c, 2d, and 2e and the first server device 3 are connected by a wireless LAN, it is possible to flexibly change and add the measurement points.

Further, by providing a wireless terminal that receives radio waves of frequencies adjacent to the frequency of the radio waves used in the local 5G system 100, it is possible to know the state of adjacent frequencies, and detect radio interference and jamming waves with public 5G and adjacent local 5G systems.

Further, the measurement data of the wireless terminals 2a, 2b, 2c, 2d, and 2e may be directly transmitted to the second server device 4 via the Internet 110, and the second server device 4 may detect an abnormal state, or notify the user by transmitting an e-mail or posting to SNS, or make the measurement data be referred to.

Although an embodiment of the present invention has been disclosed, it will be apparent that modifications may be made by those skilled in the art without departing from the scope of the present invention. All such modifications and equivalents are intended to be included in the following claims.

DESCRIPTION OF REFERENCE NUMERALS AND SIGNS

1: Local 5G monitoring system
2a, 2b, 2c, 2d, 2e: Wireless terminal
3: First server device
4: Second server device
100: Local 5G system
100a: Base station

What is claimed is:

1. A local 5G monitoring system using a plurality of wireless terminals that monitor a local 5G system, comprising:

the plurality of wireless terminals are connected to a network of the local 5G monitoring system by wireless communication and measures radio waves from a base station of the local 5G system;

a first server device that belongs to a same wireless local area network (wireless LAN) as the plurality of wireless terminals, collects measurement data from the plurality of wireless terminals, and is connected to the Internet; and a second server device that is connected to the first server device via the Internet, and is configured to be referred to by a user, wherein the first server device uses the measurement data from the plurality of wireless terminals when installation of the local 5G system is completed, as reference information, and determines and notifies the user that an abnormal state occurs, when the measurement data from the plurality of wireless terminals during an operation of the local 5G system exceeds a threshold from the reference information, wherein the measurement data is measured during the installation of the local 5G system and installation is complete when a designed throughput and designed communication delay are satisfied, and wherein the measurement data comprises a reference signal received power (RSRP) value and the first server device determines an abnormal state occurs when the RSRP value exceeds a threshold from the reference information and is reduced.

2. The local 5G monitoring system using the plurality of wireless terminals according to claim 1, wherein the plurality of wireless terminals measure a state of Internet Protocol (IP) data communication in a wireless network of the local 5G system in addition to the radio waves, as the measurement data.

3. The local 5G monitoring system using the plurality of wireless terminals according to claim 1, wherein the second server device displays the measurement data of each of the wireless terminals, for each of the wireless terminals.

4. The local 5G monitoring system using the plurality of wireless terminals according to claim 3, wherein the second server device makes display of the measurement data, from which it is determined as the abnormal state, different from other displays.

5. The local 5G monitoring system using the plurality of wireless terminals according to claim 1, wherein the first server device determines that an abnormal state occurs when at least one throughput measured by the plurality of wireless terminals exceeds a threshold from the reference information and is reduced.

6. The local 5G monitoring system using the plurality of wireless terminals according to claim 1, wherein the first server device determines that an abnormal state occurs when at least one network delay measured by the plurality of wireless terminals exceeds a threshold from the reference information and increases.

7. The local 5G monitoring system using the plurality of wireless terminals according to claim 1, wherein the first server device determines that an abnormal state occurs when the measurement data of a predetermined number of wireless terminals exceeds a threshold from the reference information and deteriorates.

8. The local 5G monitoring system using the plurality of wireless terminals according to claim 1, wherein the threshold from the reference information is based on the installation positions of the plurality of wireless terminals.

9. The local 5G monitoring system using the plurality of wireless terminals according to claim 3, wherein the wireless terminals of the plurality of wireless terminals that have measurement data indicating an abnormal state are displayed differently than the wireless terminals of the plurality of wireless terminals that have measurement data not indicating an abnormal state.

10. The local 5G monitoring system using the plurality of wireless terminals according to claim 1, wherein the second services is configured to use artificial intelligence to determine if an abnormal state occurs.

\* \* \* \* \*